(No Model.)
C. R. GORRINGE.
STRAINER AND SIEVE.
No. 490,786. Patented Jan. 31, 1893.
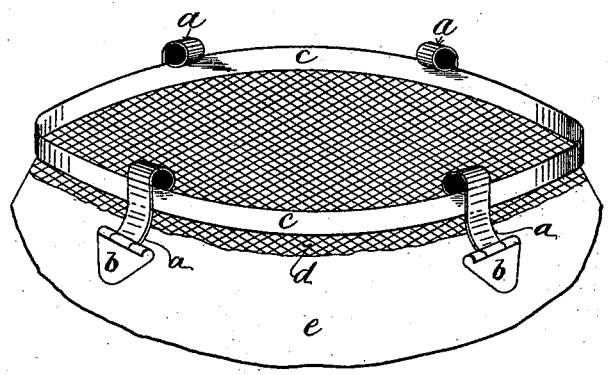

UNITED STATES PATENT OFFICE.

CHARLES RICHARD GORRINGE, OF LONDON, ENGLAND.

STRAINER AND SIEVE.

SPECIFICATION forming part of Letters Patent No. 490,786, dated January 31, 1893.

Application filed March 3, 1891. Serial No. 383,657. (No model.) Patented in England February 9, 1889, No. 2,303.

*To all whom it may concern:*

Be it known that I, CHARLES RICHARD GORRINGE, a subject of the Queen of Great Britain, and a resident of Hornsey, London, in the county of Middlesex, England, have invented new and useful Improvements in Strainers, (for which I have obtained a patent in Great Britain, No. 2,303, dated February 9, 1889,) of which the following is a full, clear, and exact specification.

This invention relates to sieves or strainers whereby the straining material is detachably secured to the rim or casing of the sieve.

To fully illustrate my invention and object I annex drawing.

The figure is a perspective view of a strainer constructed according to my invention.

$e$ is the strainer body $c$ the detachable rim secured by clips $a$ affixed to the body of the strainer at $b$.

$d$ is the wire gauze.

When it is desired to remove the material or wire gauze $d$ the rim $c$ is pressed down which allows clips $a$ to be disengaged from the rim $c$ thus enabling the gauze or straining material to be removed.

Having fully described and ascertained the nature of my invention what I claim is.

In combination, a strainer or sieve, consisting of the upper portion $e$, flared inwardly at its lower portion; the gauze $d$, over the lower end of said upper portion $e$; the cylindrical rim $c$, bearing against the flared in portion of the said upper portion $e$; and retaining said gauze $d$, in its position; and the clips $a$, hinged at $b$ to said upper portion $e$, and engaging with and over said rim $c$, substantially as described.

In testimony that I claim the foregoing I have hereunto set my hand this 8th day of March, 1892.

CHARLES RICHARD GORRINGE.

Witnesses:
JONAH WILLIAM LAMB,
17 *Cumberland Street, Caledonian Rd., Islington, N London.*
JAMES ELLIS,
*Southgate, London N.*